Feb. 25, 1941.   L. SAIVES   2,232,887
SERVO BRAKE FOR AUTOMOBILE VEHICLES
Filed May 15, 1939
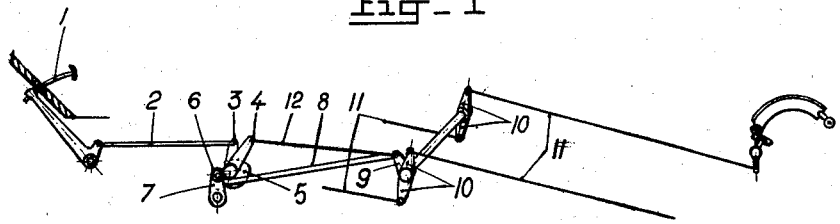
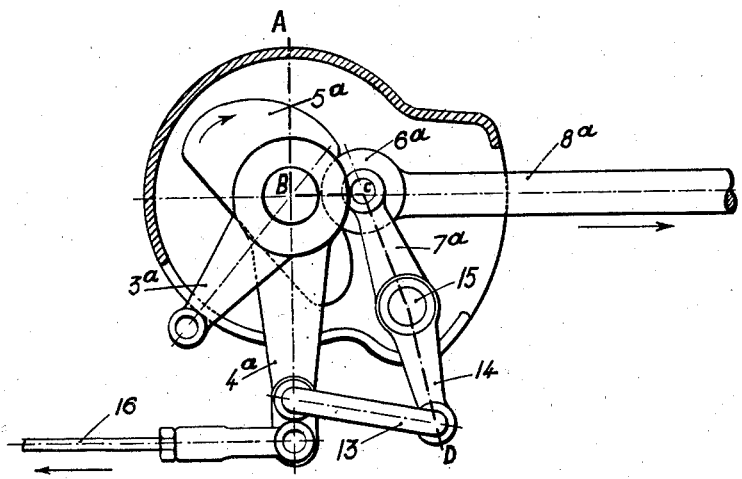
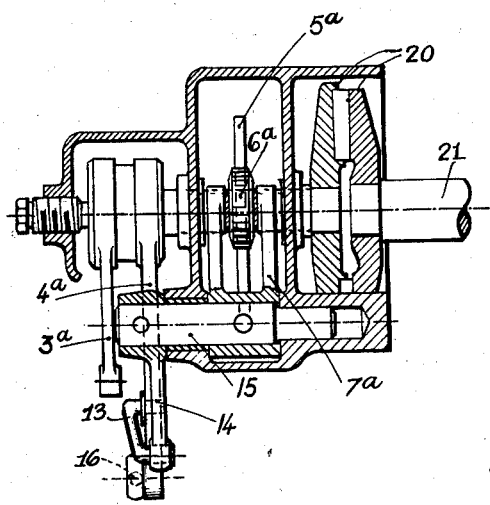
Inventor,
L. Saives
By: Glascock Downing & Seebold
Attys.

Patented Feb. 25, 1941

2,232,887

UNITED STATES PATENT OFFICE 2,232,887

SERVO BRAKE FOR AUTOMOBILE VEHICLES

Léon Saives, Billancourt, France, assignor to Louis Renault, Billancourt, France Application May 15, 1939, Serial No. 273,785
In France June 15, 1938

3 Claims. (Cl. 188—140)

This invention is for an improvement in or modification of the invention which is the object of my previous Patent No. 2,137,145 dated November 15, 1938.

My Patent 2,137,145 relates to improvements in servo brakes in which a rod-and-link gear connected to the brake members is subjected to the action of a cam which is coupled to a driving member through a clutch, the engagement of which is effected by the action of the driver on the brake pedal. This clutch control is effected by the action of two levers having inclined surfaces, one of which is connected to the brake pedal and the other to the rod-and-link gear, for example by a cable, and according to my Patent 2,137,145 a thrust roller which is subject to the action of the cam is mounted directly on one end of a rod the other end of which is connected to the other members of the rod-and-link gear.

Consequently the servo motor device must be connected to the rod-and-link gear of the brake on the one hand by a cable ensuring the braking in the stationary position, that is to say when the servo motor does not function, and on the other hand by a rod subjected to the action of the cam of the servo motor. Furthermore, according to my Patent 2,137,145 the thrust roller may be guided by an oscillating link on one end of which the spindle of the roller is mounted.

The object of the present invention is to simplify the device by the use of a single member for transmitting the braking efforts of the servo motor to the rod-and-link gear. To this end, the aforesaid cable is dispensed with and the corresponding lever is connected to the cam-controlled rod. This connection may be effected by means of a guide arm and of an articulated link.

A constructional example according to the present invention will now be described with reference to the accompanying drawing, in which:

Figure 1 is a diagrammatic illustration of the transmission of the braking efforts by means of a device according to my Patent 2,137,145, Figure 2 shows a part of the transmission according to the present invention, and Figure 3 is a section on the line ABCD of Figure 2.

Referring to Figure 1, which corresponds to the device according to my Patent 2,137,145, it will be seen that the brake pedal 1 is connected by a rod 2 to a lever 3 having inclined surfaces which is associated with a second lever 4 having inclined surfaces, so that the rotation of the lever 3 causes during operation the coupling of the servo motor and consequently rotation of a cam 5 whereas, in the stationary position, the lever 3 drives the lever 4 while bearing against the stationary members of the clutch. The cam 5 acts on a thrust roller 6 guided by a pivoted link 7 and provided at one end of a rod 8. This rod is articulated to a lever 9 which is keyed on a lay shaft wherefrom the wheel brakes are actuated through levers 10 and cables 11. The lever 4 is connected to the rod 8 by a cable 12 which ensures the transmission of the braking effort in the stationary position.

Figure 2 shows the new arrangement in which the members 3a, 4a, 5a, 6a, 7a, 8a are disposed somewhat differently. As in the above mentioned prior patent, relative rotary movement of the levers 3a and 4a causes an axial displacement of the driven member of the clutch 20, thereby coupling the cam 5a with the shaft 21 operated by the power drive of the vehicle. As will be seen from this figure, the lever 4a is no longer connected by a cable to the aforesaid cam-controlled rod 8a, but is connected to said rod by means of a coupling link 13 which is connected to an arm 14 keyed on a shaft 15. A guide arm 7a for the thrust roller 6a is also keyed on said shaft. Thus when the servo motor clutch 20 is not functioning, the rotation of the lever 4a is transmitted by the link 13 to the shaft 15 and to the arm 7a, which actuates the rod 8a, this being the only intermediate member between the servo motor and the lay shaft.

Should a hand brake control be provided, said control may comprise a rod 16 directly connected to the lever 4 as shown in Figure 2.

I claim:

1. In combination, a coupling drive operable by the power drive of a vehicle, a cam operable by said coupling device, a brake rod operable by said cam, a pivoted arm for guiding said rod, means for controlling said coupling device, said control means including relatively movable levers, and means connecting one of said levers with said guide arm for establishing a connection between said lever and said rod.

2. In combination, a coupling drive operable by the power drive of a vehicle, a cam operable by said coupling device, a brake rod operable by said cam, a pivoted arm for guiding said rod, means for controlling said coupling device, said control means including relatively movable levers, and means connecting one of said levers with said guide arm for establishing a connection between said lever and said rod, and manually operable means connected with said lever for manually actuating said rod.

3. An arrangement as claimed in claim 1 characterized in that said connecting means includes, an actuating arm connected with the guide arm and a link connecting the actuating arm with said lever.

LÉON SAIVES.